US011740078B2

(12) United States Patent
Sennott

(10) Patent No.: US 11,740,078 B2
(45) Date of Patent: Aug. 29, 2023

(54) ENHANCED SENSOR ALIGNMENT

(71) Applicant: Argo AI, LLC, Pittsburgh, PA (US)

(72) Inventor: Casey J. Sennott, Pittsburgh, PA (US)

(73) Assignee: ARGO AI, LLC, Pittsburgh, PA (US)

( * ) Notice: Subject to any disclaimer, the term of this patent is extended or adjusted under 35 U.S.C. 154(b) by 94 days.

(21) Appl. No.: 16/935,010

(22) Filed: Jul. 21, 2020

(65) Prior Publication Data

US 2022/0026200 A1   Jan. 27, 2022

(51) Int. Cl.
*G01B 17/00* (2006.01)
*G01B 21/00* (2006.01)
*G01S 7/497* (2006.01)

(52) U.S. Cl.
CPC ............. *G01B 17/00* (2013.01); *G01B 21/00* (2013.01); *G01S 7/4972* (2013.01)

(58) Field of Classification Search
CPC ........ G01B 17/00; G01B 21/00; G01S 7/4972
See application file for complete search history.

(56) References Cited

U.S. PATENT DOCUMENTS

| 7,124,046 | B2 * | 10/2006 | Maeda ..................... G06T 7/80 |
| | | | 348/E13.016 |
| 7,403,269 | B2 | 7/2008 | Yamashita et al. |
| 8,031,933 | B2 | 10/2011 | Se et al. |
| 10,384,608 | B2 | 8/2019 | Yatsuri et al. |
| 10,412,368 | B2 | 9/2019 | Osterwood et al. |

(Continued)

FOREIGN PATENT DOCUMENTS

| DE | 102011017355 A1 | 10/2012 |
| JP | 2011180022 A | 9/2011 |

(Continued)

OTHER PUBLICATIONS

International Search Report and Written Opinion of the International Searching Authority directed to related International Patent Application No. PCT/US2021/042615, dated Nov. 4, 2021; 8 pages.

(Continued)

*Primary Examiner* — Hyun D Park
*Assistant Examiner* — Lyudmila Zaykova-Feldman
(74) *Attorney, Agent, or Firm* — Sterne, Kessler, Goldstein & Fox P.L.L.C.

(57) ABSTRACT

Devices, systems, and methods are provided for enhanced sensor alignment. A device may determine a first array of displacement sensors proximate to a first test structure. The device may determine a second array of displacement sensors proximate to a second test structure. The device may apply a test condition to the first array, the second array, the first test structure, and the second test structure. The device may collect a first output from applying the test condition to the first test structure. The device may collect a second output from applying the test condition to the second test structure. The device may generate a first deviation vector associated with the first output. The device may generate a second deviation vector associated with the second output. The device may determine a first design status of the first structure based on the first deviation vector. The device may determine a second design status of the second structure based on the second deviation vector.

20 Claims, 6 Drawing Sheets

(56) References Cited

U.S. PATENT DOCUMENTS

| | | | |
|---|---|---|---|
| 2003/0185421 A1* | 10/2003 | Okamoto | G06V 20/58 382/104 |
| 2005/0237385 A1 | 10/2005 | Kosaka et al. | |
| 2006/0140510 A1* | 6/2006 | Wallace | G06V 40/10 382/285 |
| 2007/0058049 A1* | 3/2007 | Kawahara | H04N 5/225 348/E5.045 |
| 2007/0165910 A1* | 7/2007 | Nagaoka | G06V 20/58 382/104 |
| 2007/0291125 A1* | 12/2007 | Marquet | H04N 13/204 348/207.99 |
| 2009/0135246 A1* | 5/2009 | Uchiyama | G03B 35/08 348/E13.001 |
| 2010/0208034 A1* | 8/2010 | Chen | G06T 7/97 348/E13.001 |
| 2010/0302370 A1 | 12/2010 | Sogawa et al. | |
| 2016/0227193 A1* | 8/2016 | Osterwood | G01S 17/42 |
| 2017/0212215 A1 | 7/2017 | Hellinger et al. | |
| 2017/0217371 A1* | 8/2017 | Yatsuri | H04N 13/239 |
| 2017/0223341 A1 | 8/2017 | Yatsuri et al. | |
| 2018/0350107 A1* | 12/2018 | Myokan | H04N 23/64 |
| 2019/0094347 A1 | 3/2019 | Singh | |
| 2019/0208182 A1 | 7/2019 | Aoki et al. | |
| 2020/0116854 A1 | 4/2020 | Jeon | |
| 2021/0291780 A1* | 9/2021 | Cech | G06V 20/593 |

FOREIGN PATENT DOCUMENTS

| | | |
|---|---|---|
| JP | 2014-074632 A | 4/2014 |
| JP | 2014074632 A | 4/2014 |
| KR | 20200040391 A | 4/2020 |

OTHER PUBLICATIONS

A. Zaarane et al. "Distance Measurement System for Autonomous Vehicles Using Stereo Camera," in Array, 2020, pp. 100-116, vol. 5, 100016, ISSN 2590-0056, United States.

* cited by examiner

ENHANCED SENSOR ALIGNMENT

TECHNICAL FIELD

This disclosure generally relates to systems and methods for enhanced sensor alignment.

BACKGROUND

Some vehicles are equipped with a sensor system to collect data relating to the current and developing state of the vehicle's surroundings. The proper performance of a vehicle depends on the accuracy of the sensor system. The sensor system may comprise visual spectrum cameras, laser-ranging devices (LIDARs), thermal sensors, or other types of sensors. The sensor system enables a vehicle to detect objects and obstacles in the vicinity of the vehicle and tracks the velocity and direction of pedestrians, other vehicles, traffic lights, or similar objects in the environment around the vehicle. However, these sensors should be aligned for the data to be reliable. Therefore, there is a need to enhance the alignment of sensors to ensure that the data is consistent in order not to undermine the vehicle control.

Figure 1:
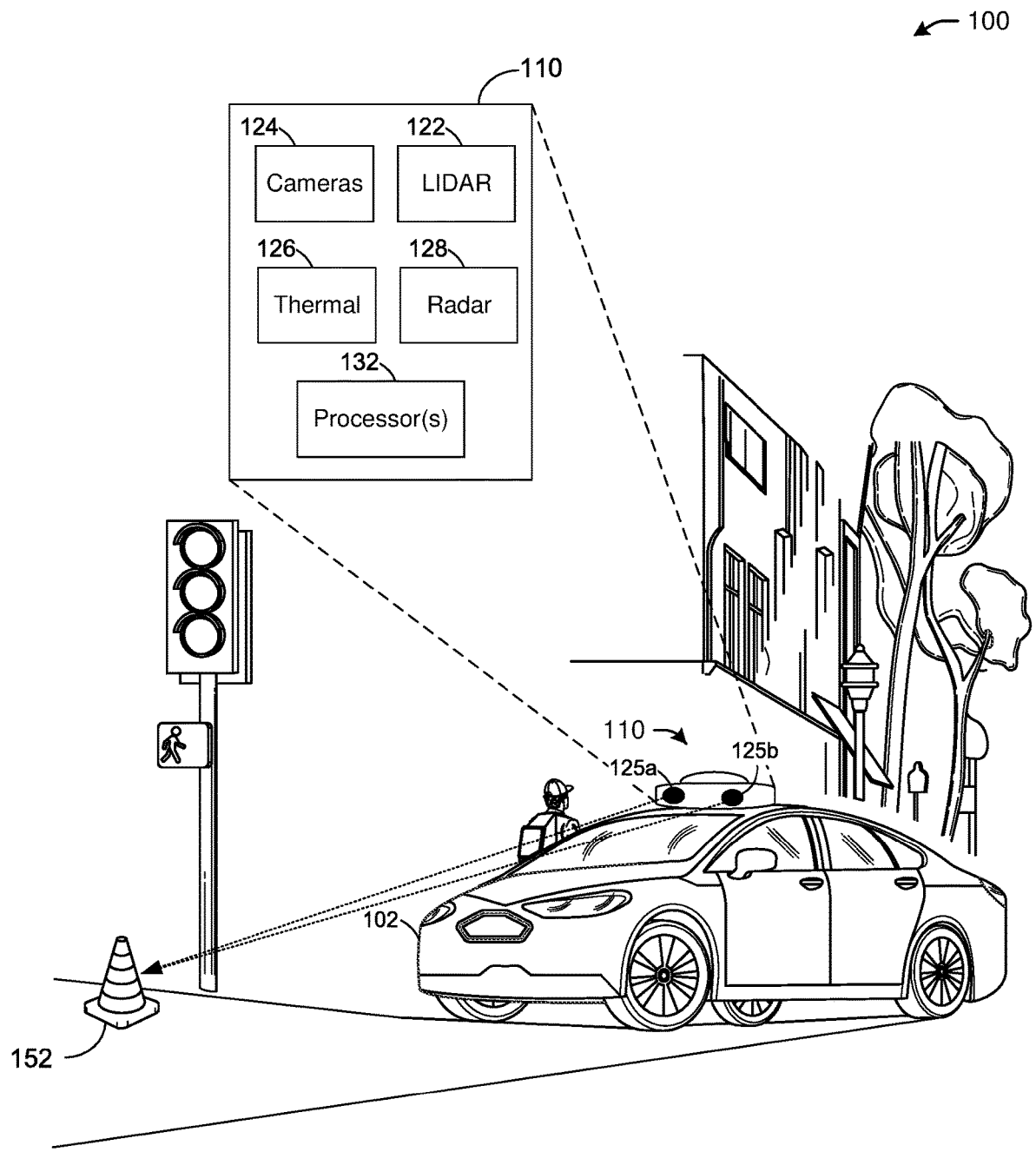
FIG. 1 illustrates example environment of a vehicle, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for enhanced sensor alignment.

In one or more embodiments, an enhanced sensor alignment system may facilitate the testing and measurement for verifying mechanical structures to meet certain thresholds after being exposed to a variety of environmental conditions that could cause misalignment with other mechanical structures. Some of the environmental conditions that could cause misalignment may include the impact of vibration, thermal shock, or similar conditions. Currently, there are no off-the-shelf solutions for verifying mechanical structures for such conditions. In some examples, verifying these mechanical structures includes determining a deviation under test simulated conditions and determining the degree of alignment or misalignment between a plurality of structures.

In some embodiments, the mechanical structures may include a variety of sensors, emitters, or cameras. Typically, a stereo camera assembly includes two or more cameras and is commonly used in robotic devices or autonomous cars. For example, two cameras may be positioned a distance apart, pointing in the same direction, and are carefully aligned with each other to generate a 3-D distance data, which may then be used by various algorithms to help detect objects and take certain measures while navigating the robotic device or the autonomous car. However, because stereo cameras rely on a tight alignment between the cameras, which needs to be known by the software ahead of time, these type of stereo cameras are not used in many applications because of their susceptibility to environmental conditions. For example, in an autonomous vehicle application, while the vehicle is on the road, the stereo cameras may go out of alignment due to the impact of vibration, thermal shock, or similar conditions. Because of these conditions, it would become very difficult for the software to decipher the data. That data becomes more unreliable as the misalignment increases.

In some example embodiments, an enhanced sensor alignment system may assess mechanical structures associated with stereo cameras to eliminate or minimize the impact of vibration, thermal shock, or other factors that may cause a misalignment between two or more stereo cameras based on the assessment. It should be understood that stereo cameras are used as an example and that other applications where two or more structures that require operations in a synchronized and aligned manner may be used instead of stereo cameras, in accordance with one or more example embodiments of the present disclosure.

In one or more embodiments, an enhanced sensor alignment system may facilitate verification to a high degree of precision that two or more structures (e.g., two stereo cameras) are aligned with each other under a variety of testing environments, such as vibration, thermal shock, or other conditions. In other words, the enhanced sensor alignment system may determine whether the structures are aligned to meet a threshold level and may provide output data based on the threshold. The threshold may be predetermined based on software requirement, quality control requirement, operational tolerance level, or based on other system or device requirements.

In one or more embodiments, an enhanced sensor alignment system may provide feedback based on the assessment of a physical structure to determine performance under real-life situations, for example, an autonomous car driving on the road. The feedback may be in the form of output data collected using the enhanced sensor alignment system when the physical structure is subjected to thermal or vibration loading.

In one or more embodiments, an enhanced sensor alignment system may assess whether a design of a physical structure is designed to meet certain specifications, such as alignment of structures with a tolerance level. For example, stereo cameras may have been produced by an original equipment manufacturer (OEM). The enhanced sensor alignment system may facilitate an assessment of the stereo cameras, in accordance with one or more example embodiments of the present disclosure to determine whether the stereo cameras meet the threshold levels needed for applications such as robotic devices or autonomous cars.

In one or more embodiments, an enhanced sensor alignment system may measure a relative alignment of a reference surface with another surface. For example, the reference surface may be a fixed structure that is subjected to the stress conditions (e.g., environmental conditions), which may be chosen such that the reference surface results in a very minimal movement under such stress conditions. This reference surface may provide a baseline to be used when a physical structure is subjected to the same stress conditions. Feedback data may be collected when the reference surface is subjected to the stress conditions, which is then compared to feedback data collected when the physical structure (e.g., a stereo camera) is subjected to the same stress conditions. This creates a relative alignment comparison between the two structures (e.g., reference surface and the physical structure). The comparison may result in a difference measurement that is then compared to the threshold level.

In one or more embodiments, an enhanced sensor alignment system may utilize an array of high fidelity displacement sensors that are positioned to aim at a surface under test. A high fidelity displacement sensor may be a sensor that experiences minimal to no distortion under test conditions in addition to being highly accurate in measuring displacement experienced by an object. The enhanced sensor alignment system would facilitate the measurement of angular rotations between target surfaces under thermal or vibrational loading, or other conditions. The enhanced sensor alignment system may utilize the array of high fidelity displacement sensors to generate out-of-plane measurements that would be used to define a plane. The enhanced sensor alignment system would then calculate rotations of the target surfaces under test thermal or vibrational loading. The rotations may be represented by a vector in the form of pitch, yaw, and roll, which are the three dimensions of movement that describe an object's movements through the air.

The high fidelity displacement sensors may collect data from that surface. For example, three high fidelity displacement sensors may aim at a first surface, and another three high fidelity displacement sensors may aim at a second surface. The data collected using the array of high fidelity displacement sensors may facilitate extracting one or more alignment vectors from the motion of the first surface and one or more alignment vectors from the motion of the second surface. Based on the one or more alignment vectors, the enhanced sensor alignment system may determine, to a high degree of precision, the difference between the alignment vectors associated with the two surfaces. In other words, data collected from the first three high fidelity displacement sensors facilitate the extraction of a first alignment vector, and the second three high fidelity displacement sensors facilitate the extraction of a second alignment vector. The enhanced sensor alignment system may then determine a difference between the first alignment vector to a reference vector and the second alignment vector to the reference vector. The high fidelity displacement sensors may include any non-contact sensor capable of capturing how much a surface bends or shifts or deflects, without having any of the displacement sensors touch any of these surfaces under test. Some examples of the high fidelity displacement sensors may include inductive rangefinder sensors, one or more laser distance measurement devices, or one or more interferometer, or any linear non-contact type sensors.

In one or more embodiments, an enhanced sensor alignment system may assess, for any given physical design, how much motion the design is experiencing under the various tests. The enhanced sensor alignment may capture data to determine an amount of motion using alignment vectors, which are then compared first to each other and also to a reference or target surface. Most systems rely on an image that a camera produces. The camera is then subjected to stress conditions. Then these systems compare objects on the images to determine whether a camera meets certain specifications. However, these types of systems are unreliable under vibration or thermal shock environment because of the complication of comparing images; it is not possible to determine to what level of confidence an object is missing or misinterpreted by comparing the before and after images when subjecting the camera to stress conditions. A purpose of the enhanced sensor alignment system is to provide a mechanical measure through the use of displacement sensors to capture movements of cameras when these cameras are subjected to conditions that cause motion of the cameras as a way to assess the actual design of the cameras as opposed to having to process images from before and after subjecting the cameras to stress conditions.

The mechanical structures (e.g., stereo cameras) may be collocated with a test measurement device (e.g., an inductive rangefinder) that can survive the test environment while collecting data. The test measurement device may be used to assess the design of the mechanical structures under the test environment. In other words, the test measurement device should not introduce additional variables based on its movement under the test environment. One example of an inductive rangefinder that may be used as a test measurement device may be a Micro-Epsilon® shielded inductive displacement sensor, however other test measurement device that can withstand the test environment while collecting high fidelity data may be used.

The measurements taken under the test environment may be taken of a stiff structure that causes minimal to no movement. This stiff structure may be used as a baseline or a reference target. When the mechanical structure is subjected under the same test environment as the baseline or reference surface, measurements are taken using the test measurement device to determine how much of a movement the mechanical structure has undergone relative to the baseline or reference surface. That is, the enhanced sensor alignment system may assess the noise of the mechanical structure using these reference surfaces. This may determine to what level a precision an actual structure can be measured at.

In one or more embodiments, an enhanced sensor alignment system may utilize a data acquisition system to store the data collected by the test measurement device (e.g., an inductive rangefinder). The test measurement device may comprise a plurality of sensors. The collected data provides a linear measurement of the displacement of a point on the target surface that an individual sensor of the inductive rangefinder is measuring at a specific time. Based on the linear measurement, the enhanced sensor alignment system may extract the deviation of a first target surface (e.g., a first stereo camera) and the deviation of a second target surface (e.g., a second stereo camera).

In one or more embodiments, an enhanced sensor alignment system may facilitate examining one aspect of a test system at a time. That is, the enhanced sensor alignment system facilitates assessing a particular mechanical structure of a test system. For example, in the case where the test system comprises two or more cameras attached through a bracket, the enhanced sensor alignment system may facilitate assessing whether the bracket introduces vibration or alteration to image signals received by the cameras. For example, the enhanced sensor alignment system may determine whether the sensors within the cameras, the camera housing, or the bracket, or any other component of the test system are introducing the vibration. In the case of having a bracket connecting the two cameras, the bracket does not need to be in a certain shape or form. For example, the bracket may have a curvature resulting in the cameras being pointed in various directions. The enhanced sensor alignment system may verify to a high degree of precision that the various structures under test (e.g., stereo cameras and the bracket), using a variety of testing condition, such as vibration, thermal shock, or other conditions, are performing to a certain requirement level when comparing deviations of the cameras and the bracket to a baseline or a reference surface. When measurements are taken, the measurements result in output data that is stored locally or remotely to be used to validate a physical design of a structure to withstand test conditions and meet certain thresholds. When the output data is greater than a deviation threshold when comparing the output data to an alignment vector, this indicates to the enhanced sensor alignment system that the physical design of the structure may not meet the required level. In that case, modification to the design may be required to meet the required level.

In one or more embodiments, an enhanced sensor alignment system may facilitate collecting output data over a period of time to determine deviations under prolonged test conditions. In some examples, an enhanced sensor alignment system may facilitate taking a baseline displacement measurement of a reference target using a set of sensors of an inductive rangefinder. The enhanced sensor alignment system may then use the set of sensors of the inductive rangefinder to point to a first camera. The enhanced sensor alignment system may use another set of sensors of the inductive rangefinder pointed to a second camera. The enhanced sensor alignment system may capture data from both the first camera and the second camera when the first camera and second camera are subjected to a test condition. The enhanced sensor alignment system may generate a first deviation vector of the first camera and a second deviation vector of the second camera. The first deviation vector is then compared to the baseline measurement, which is in the form of an alignment vector to determine how the first camera is aligned relative to its base condition. Similarly, the second deviation vector is then compared to the baseline measurement to determine how the second camera is aligned relative to its base condition.

In some scenarios, one or more stereo cameras may first go through a calibration process to initially align these cameras. Calibration may be performed by taking a plurality of images. For example, in the case of autonomous vehicles, the one or more stereo cameras may be placed on a turntable to take a plurality of images as the turntable rotates. The images may be taken of targets, such as checkerboards. An algorithm may be used to determine the base configuration of the cameras, which would be considered to be the baseline of calibration between the cameras. The assumption is that the cameras would be stable and not moved. This sets an original calibrated baseline of the cameras before being introduced to real-life conditions, such as driving on the road.

Currently, there is no accepted solution to the problem. Algorithms may be developed to compensate for the misalignment that results from real-life scenarios, or the sensors can be calibrated more often. However, going over a speed bump, for example, may place these cameras out of alignment again. In real-life situations, it is very difficult to diagnose these issues based solely on acquiring images using the cameras and comparing images over time. For example, in the case of vibration, the cameras may incorrectly detect an object or may not even detect the object. It would not be feasible to determine whether misalignment due to vibration has occurred because it is not feasible to determine the absence of an object in the images.

In one or more embodiments, an enhanced sensor alignment system may assess the mechanical structures of a test system to determine a high degree of certainty that once calibration has been completed, the mechanical structures (e.g., a plurality of cameras) would perform close to the originally calibrated baseline of these mechanical structures.

Other embodiments may include determining the alignment of sources such as a plurality of lasers or optical light sources and tracking the misalignment of these sources. This produces a beam of light that may help determine the misalignment of these sources under the test conditions. In one or more embodiments, an enhanced sensor alignment system may facilitate assessing how much the beam of light has deviated from a reference or a baseline beam of light.

In one or more embodiments, an enhanced sensor alignment system allows assessment of the level of misalignment of structures under test. For example, a test may be performed of a structure under a temperature change. One or more level of misalignments associated with various tests under temperature changes may be recorded and then stored in a lookup table. Later, these levels of misalignment may used to perform compensations to the structures under test.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates example environment 100 of a vehicle 102, in accordance with one or more example embodiments of the present disclosure.

Referring to FIG. 1, there is shown a vehicle 102 having a sensor system 110 for a plurality of cameras, emitters, and sensors. The sensor system 110 may be connected to the vehicle 102 (e.g., on top of the vehicle 102 as shown). In this environment 100, there shown that sensor system 110 includes cameras such as stereo cameras 125a and 125b. The stereo cameras 125a and 125b may capture images of objects (e.g., object 152) in the vicinity and around the vehicle 102. Other emitters and sensors in the housing 110 may transmit and/or receive one or more signals in order to detect and/or capture information associated with objects in the vicinity and around the vehicle 102. For example, a LIDAR sensor may transmit a LIDAR signal (e.g., light or an electromagnetic wave), a radar uses radio waves in order to determine distances between the vehicle and objects in the vicinity of the vehicle, and a thermal sensor may capture temperature (e.g., based on an emitted and detected infrared signal or other laser signals).

In one or more embodiments, the sensor system 110 may include LIDAR 122. Some examples of a LIDAR such as Geiger mode LIDAR, ground-based LIDAR, large footprint LIDAR, small footprint LIDAR, or the like. The sensor system 110 may include cameras 124 such as stereo cameras that may capture images in the vicinity of the vehicle 102. The sensor system 110 may include a thermal sensor 126, such as thermistors, resistance temperature detectors, thermocouples, semiconductors, or the like. Further, the sensor system may include a radar 128, which may be any radar that uses radio waves to capture data from objects surrounding the vehicle 102. The sensor system 110 may also include one or more processors 132. The one or more processors 132 may control the transmission and reception of signals using the LIDAR 122, the cameras 124, the thermal sensor 126, and the radar 128. The various sensors of the sensor system 110, when calibrated correctly, should indicate a proper distance and shape of object 152. However, the vehicle 102 may be subjected to environmental conditions such as vibration, thermal shock, or similar conditions. Under such conditions, the various sensors of the sensor system 110 may fall out of alignment. This would result in the data received from these various sensors to be unreliable when processed by processors 132.

In one or more embodiments, an enhanced sensor alignment system may facilitate the testing and measurement for verifying mechanical structures (e.g., any of the sensors of the sensor system 110) to meet certain thresholds after being exposed to a variety of environmental conditions that could cause misalignment with other mechanical structures. The enhanced sensor alignment system may be used to validate the mechanical structures before using them in real-life scenarios like driving vehicle 102 on a road. The enhanced sensor alignment system may be used in a test environment independent of the vehicle 102. Some of the environmental conditions that could cause misalignment may include the impact of vibration, thermal shock, or similar conditions. In some examples, verifying these mechanical structures includes determining a deviation under test simulated conditions and determining the degree of alignment or misalignment between a plurality of structures.

For example, when using stereo cameras 125a and 125b on vehicle 102, while the vehicle 102 is on the road, the stereo cameras 125a and 125b may go out of alignment due to the impact of vibration, thermal shock, or similar conditions. Because of these conditions, it would become very difficult for the software to decipher the data. That data becomes more unreliable as the misalignment increases.

In some example embodiments, an enhanced sensor alignment system may assess mechanical structures of stereo cameras 125a and 125b to eliminate or minimize the impact of vibration, thermal shock, or other factors that may cause a misalignment between two or more stereo cameras based on the assessment. It should be understood that stereo cameras 125a and 125b are used as an example and that other applications where two or more structures that require operations in a synchronized and aligned manner may be used instead of stereo cameras, in accordance with one or more example embodiments of the present disclosure.

In one or more embodiments, an enhanced sensor alignment system may facilitate verification to a high degree of precision that stereo cameras 125a and 125b are aligned with each other under a variety of testing environments, such as vibration, thermal shock, or other conditions. In other words, the enhanced sensor alignment system may determine whether the structures are aligned to meet a threshold level and may provide output data based on the threshold. The threshold may be predetermined based on software requirement, quality control requirement, operational tolerance level, or based on other system or device requirements.

Other embodiments may include determining the alignment of sources such as a plurality of lasers or optical light sources and tracking the misalignment of these sources. This produces a beam of light that may help determine the misalignment of these sources under the test conditions. In one or more embodiments, an enhanced sensor alignment system may facilitate assessing how much the beam of light has deviated from a reference or a baseline beam of light.

Figure 2A:
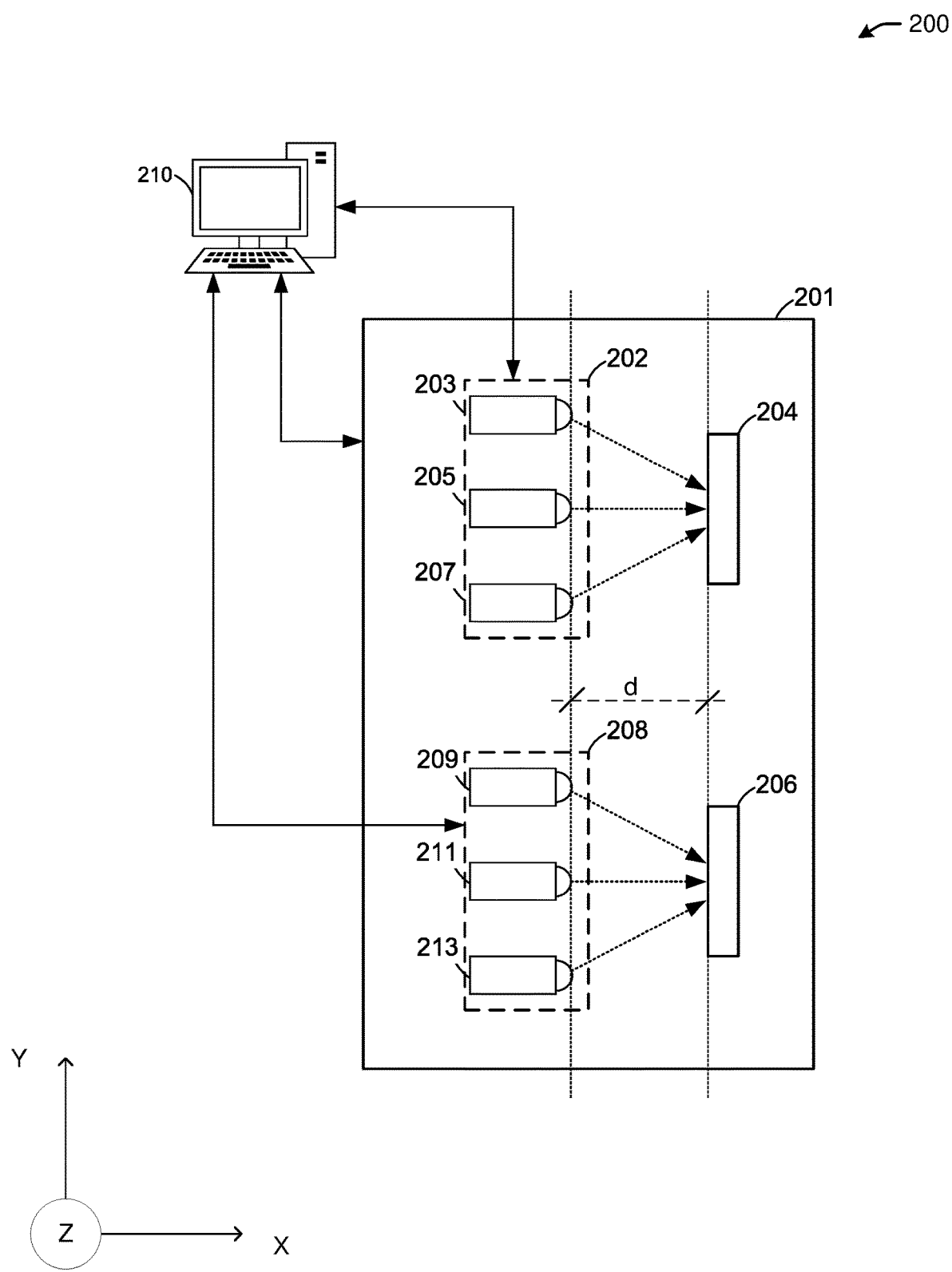
FIG. 2A depicts an illustrative schematic diagram for enhanced sensor alignment, in accordance with one or more example embodiments of the present disclosure.

FIG. 2A depicts an illustrative schematic diagram for enhanced sensor alignment, in accordance with one or more example embodiments of the present disclosure.

In one or more embodiments, an enhanced sensor alignment system may assess whether a design of a physical structure is designed to meet certain specifications, such as alignment of structures with a tolerance level. For example, stereo cameras may have been produced by an original equipment manufacturer (OEM). The one or more measurement devices may assess the stereo cameras, in accordance with one or more example embodiments of the present disclosure to determine whether these stereo cameras meet the threshold levels needed for applications such as autonomous cars.

Referring to FIG. 2A, there is shown a test platform 201 that is used as a fixed base to which one or more measurement devices (e.g., measurement devices 202 and 208) and one or more target surfaces (e.g., target surfaces 204 and 206) are affixed. The target surfaces 204 and 206 may be in certain scenarios two stereo cameras. Each of the one or more measurement devices may comprise one or more displacement sensors that measure the movements of target surfaces 204 and 206 under certain conditions. For example, measurement device 202 may comprise three displacement sensors 203, 205, and 207, and measurement device 208 may comprise another three displacement sensors 209, 211, and 213. It should be understood that each of the measurement devices 202 and 208 may comprise any number of displacement sensors and not limited to three displacement sensors, as given in the above example.

In one or more embodiments, an enhanced sensor alignment system may provide feedback based on the assessment of a physical structure to determine performance under real-life situations, for example, an autonomous car driving on the road. The feedback may be in the form of output data collected using the enhanced sensor alignment system when the physical structure is subjected to thermal or vibration loading.

The measurement devices 202 and 208 may be placed at a distance d from the target services 204 and 206. The distance d may be very short without allowing the measurement devices 202 and 208 to touch each respective target surface.

The one or more measurement devices may verify to a high degree of precision that the target surfaces 204 and 206 are aligned under a variety of testing environment, such as vibration, thermal shock, or other conditions. In other words, one or more measurement devices may determine whether the target surfaces 204 and 206 are aligned by verifying that they meet a deviation threshold based on a baseline measurement. The deviation threshold may be predetermined based on software requirement, quality control requirement, operational tolerance level, or based on other system or device requirements.

The one or more measurement devices may determine, under a certain condition, the relative movement of the target structures 204 and 206 compared to a baseline movement of reference structure. For example, the one or more measurement devices may capture the movement of a reference structure under a certain condition (e.g., vibration, thermal, etc.). The movement of the reference structure may be represented by a reference vector in the form of pitch, yaw, and roll. For example, when the target surface 204 subjected to the same condition (e.g., vibration, thermal, etc.), its movement is represented by a vector, which is then compared to the reference vector. A similar measurement is performed for target surface 206. If the comparison between a target surface (e.g., target surface 204 or target surface 206) and the reference structure results in a difference that is below a deviation threshold, it may be determined that the target surface (e.g., target surface 204) is capable of operating in a real-life situation (e.g., while the vehicle is on the road) to ensure proper synchronization and alignment with another target surface (e.g., target surface 206). However, if the comparison between the target surface and the reference structure results in a difference that is above the deviation threshold, it may be determined that the target surface is not capable of operating in a real-life situation to ensure proper synchronization and alignment with the other target surface.

Figure 2B:
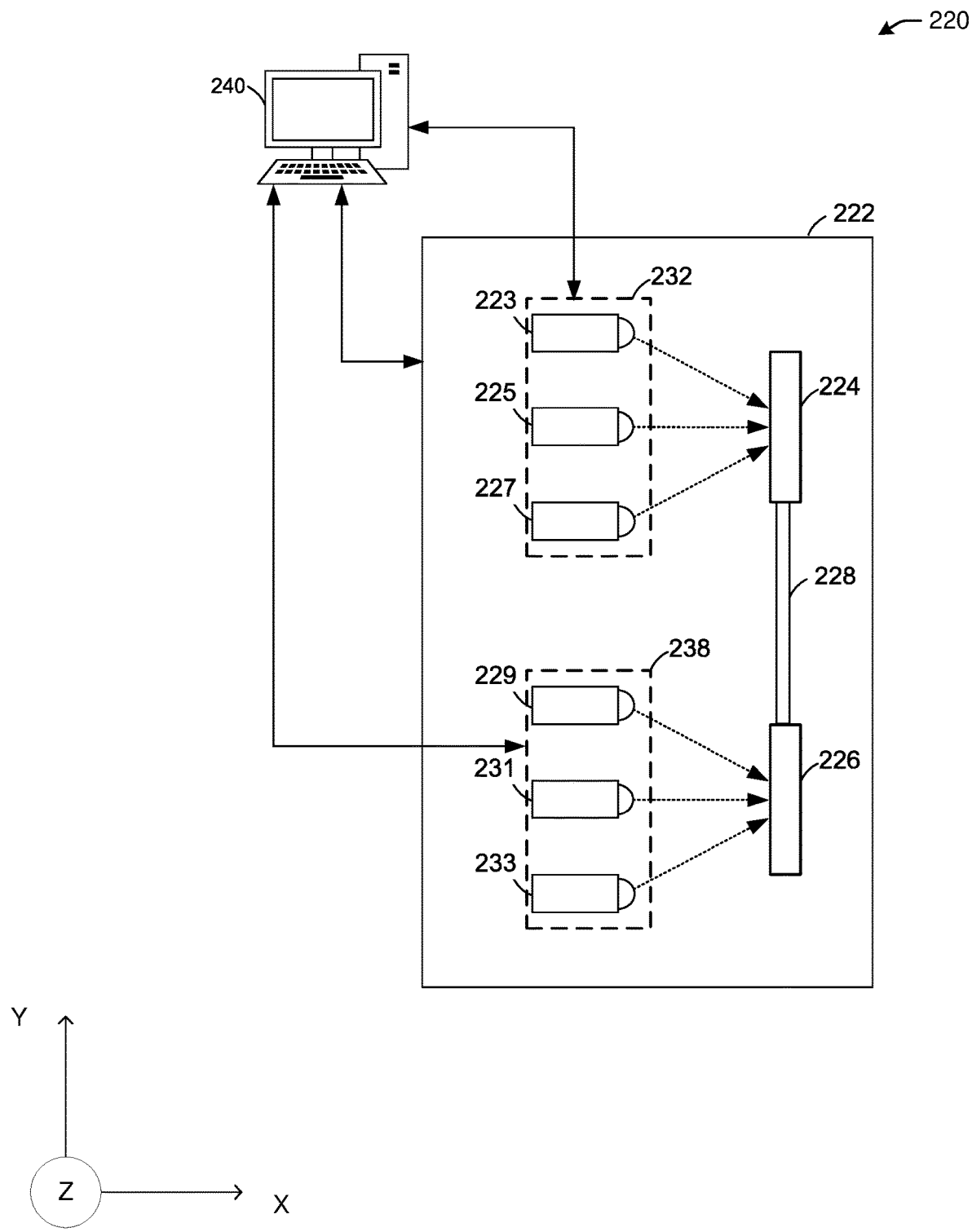
FIG. 2B depicts an illustrative schematic diagram for enhanced sensor alignment, in accordance with one or more example embodiments of the present disclosure.

FIG. 2B depicts an illustrative schematic diagram of environment 220 for enhanced sensor alignment, in accordance with one or more example embodiments of the present disclosure.

Referring to FIG. 2B, there is shown a top view (in X, Y plane) of a test platform 222 that is used as a fixed base to which one or more measurement devices (e.g., measurement devices 232 and 238) and one or more target surfaces (e.g., target surfaces 224 and 226) are affixed. The target surfaces 224 and 226 may be in certain scenarios two stereo cameras that are connected together through a structure, such as the bracket 228. It should be noted that it is not necessary that the bracket 228 has a certain shape or form. For example, the bracket 228 may have a curvature resulting in the cameras being pointed in various directions. Each of the one or more measurement devices may comprise one or more displacement sensors that measure the movements of target surfaces 224 and 226 under certain conditions. For example, measurement device 232 may comprise three displacement sensors 223, 225, and 227, and measurement device 238 may comprise another three displacement sensors 229, 231, and 233. It should be understood that each of the measurement devices 232 and 238 may comprise any number of displacement sensors and not limited to three displacement sensors, as given in the above example.

In one or more embodiments, the one or more measurement devices may examine one aspect of a test system at a time. That is, the one or more measurement devices facilitate assessing a particular mechanical structure of a test system. For example, in the case where the test system comprises two or more cameras attached through a bracket, the one or more measurement devices may facilitate assessing whether the bracket introduces vibration or alteration to image signals received by the cameras. The enhanced sensor alignment system may verify to a high degree of precision that the various structures under test (e.g., target surfaces 224 and 226) using a variety of testing conditions, such as vibration, thermal shock, or other conditions, are performing to a requirement level by comparing deviations of the target surfaces and the bracket 228 to a baseline or a reference structure. When measurements are taken, the measurements result in output data that is stored locally or remotely to be used to validate a physical design of a structure to withstand test conditions and meet certain thresholds. In case the output data is greater than a deviation threshold by comparing the output data to an alignment vector, this indicates to the enhanced sensor alignment system that the physical design of the structure may not meet the test conditions. In that case, modification to the design may then be required to meet the deviation threshold. For example, the one or more measurement devices 232 and 238 may capture the movement of a reference structure under a certain condition (e.g., vibration, thermal, etc.). The movement of the reference structure may be represented by a reference vector in the form of pitch, yaw, and roll. For example, when each of the target surface 224, target surface 226, and bracket 228 are subjected to the same condition (e.g., vibration, thermal, etc.), each movement of each of target surface 224, target surface 226, and bracket 228 is represented by a vector which is then compared to the reference vector. This measurement may be performed for each component of the entire structure (target surface 224, target surface 226, or bracket 228). If the comparison between at least one of the target surface 224, target surface 226, or bracket 228 and the reference structure results in a difference that is below a deviation threshold, it may be determined that that component is capable of operating in a real-life situation (e.g., while the vehicle is on the road) to ensure proper synchronization between target surface 224 and target surface 226. However, if the comparison between at least one of the target surface 224, target surface 226, or bracket 228 and the reference structure results in a difference that is above the deviation threshold, it may be determined that that component would not be capable of operating in a real-life situation to ensure proper synchronization and alignment between the target surface 224 and the target surface 226. It is understood that the above descriptions are for purposes of illustration and are not meant to be limiting.

Figure 3:
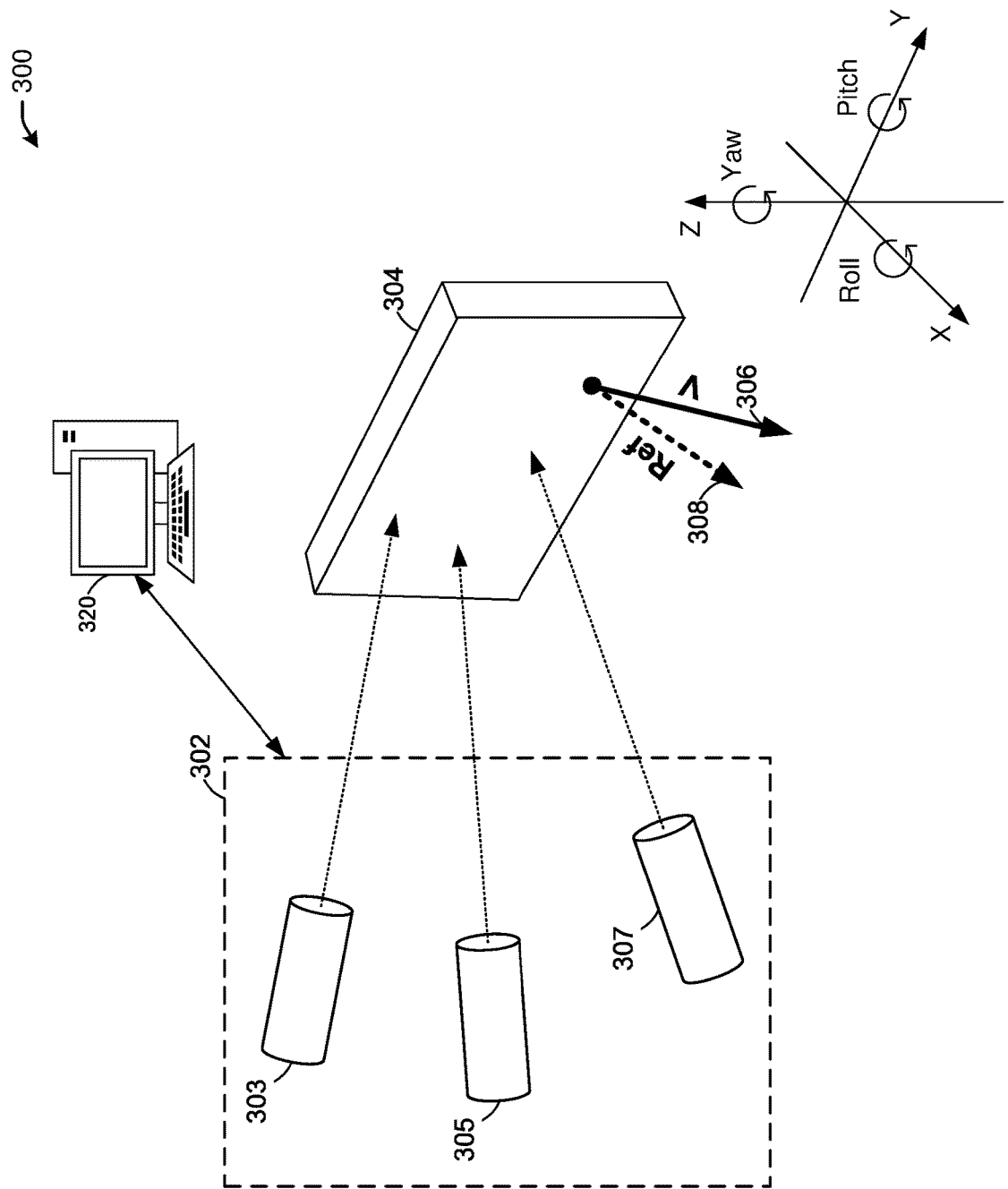
FIG. 3 depicts an illustrative schematic diagram for enhanced sensor alignment, in accordance with one or more example embodiments of the present disclosure.

FIG. 3 depicts an illustrative schematic diagram for enhanced sensor alignment, in accordance with one or more example embodiments of the present disclosure.

Referring to FIG. 3, there is shown a three-dimensional view (in X, Y, Z planes) of a test environment 300, where a measurement device 302 is used to validate a target surface 304 based on movements resulting from subjecting the test environment 300 to vibration, thermal shock, or other conditions. The measurement device 302 may be comprised of three displacement sensors 303, 305, and 307. It should be understood that the measurement device 302 may comprise any number of displacement sensors and not limited to three displacement sensors, as given in the above example.

In one or more embodiments, an enhanced sensor alignment system may utilize as a measurement device 302, an array of displacement sensors 303, 305, and 307 that are positioned to aim at the target service 304. The displacement sensors 303, 305, and 307 may collect data from target service 304 while the test environment 302 is subjected to a test condition (e.g., vibration, thermal shock, or other conditions). The data collected using the array of displacement sensors may facilitate extracting an alignment vector 306 from the motion of the target surface 304 due to being subjected to the test condition. Based on the alignment vector 306, the enhanced sensor alignment system may determine the difference between the alignment vector 306 associated with the target surface 304 and a reference vector (e.g., reference vector 308). The reference vector 308 represents the movement of a reference surface that was subjected to the same test condition. The reference vector 308 and the alignment vector 306 may be presented in the form of pitch, yaw, and roll, which are the three dimensions of movement that describe the target surface 304 and the reference surface's movements through the air. The enhanced sensor alignment system may then determine a difference between the alignment vector 306 and the reference vector 308. The difference is then compared to a deviation threshold. When the difference is greater than the deviation threshold, this indicates to the enhanced sensor alignment system that the physical design of the target surface 304 may not meet the test conditions. In that case, modification to the design may then be required to meet the deviation threshold. The deviation threshold may be predetermined based on software requirement, quality control requirement, operational tolerance level, or based on other system or device requirements.

The displacement sensors 303, 305, and 307 may include any non-contact sensor capable of capturing how much a surface bends or shifts or deflects, without having any of the displacement sensors touch any of these surfaces under test. Some examples of the high fidelity displacement sensors may include inductive rangefinder sensors, one or more laser distance measurement devices, or one or more interferometer, or any linear non-contact type sensors.

Figure 4:
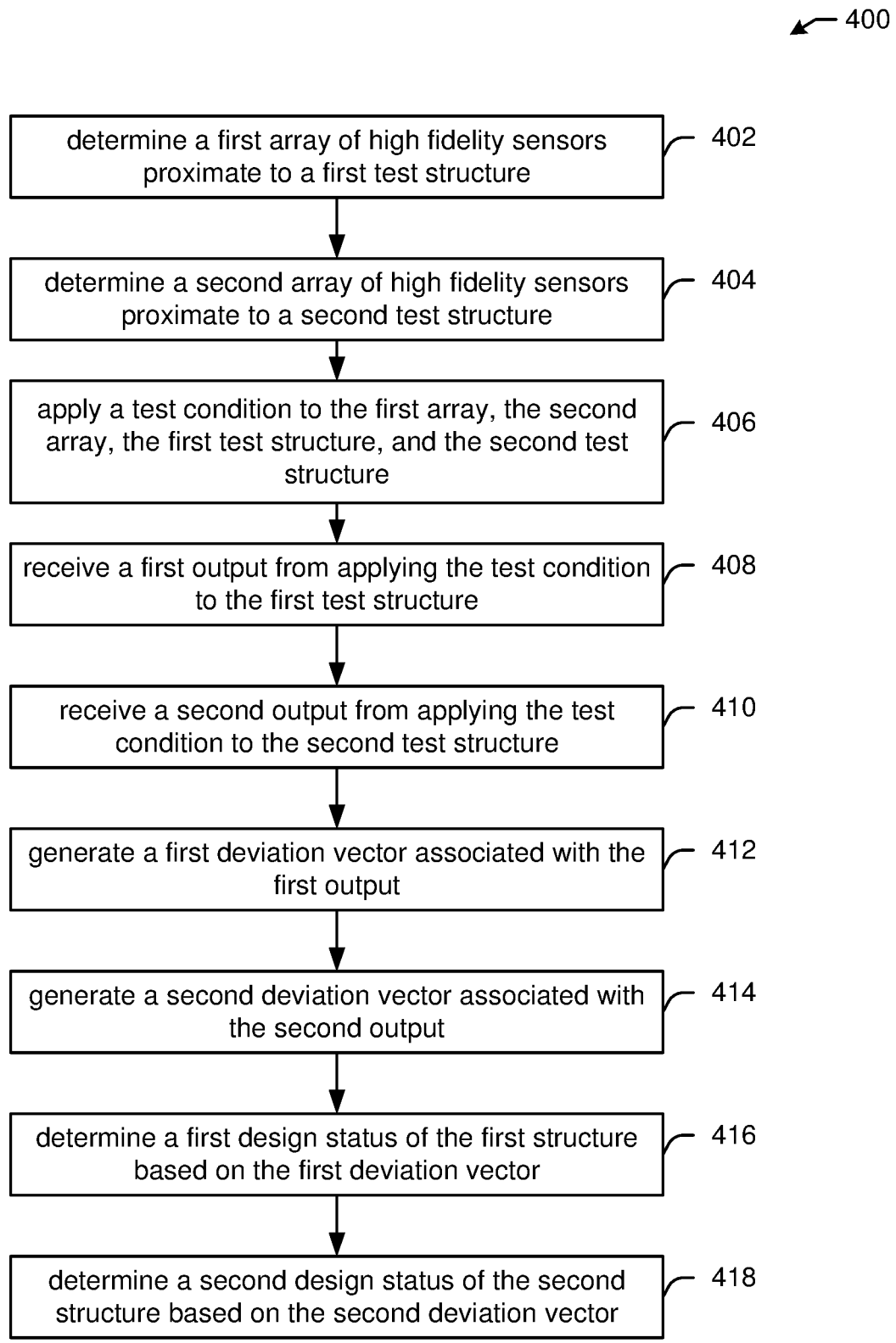
FIG. 4 illustrates a flow diagram of process for an illustrative enhanced sensor alignment system, in accordance with one or more example embodiments of the present disclosure.

It is understood that the above descriptions are for purposes of illustration and are not meant to be limiting. FIG. 4 illustrates a flow diagram of process 400 for an illustrative enhanced sensor alignment system, in accordance with one or more example embodiments of the present disclosure.

At block 402, a device may determine a first array of high fidelity sensors proximate to a first test structure.

At block 404, the device may determine a second array of high fidelity sensors proximate to a second test structure. The first test structure may be a first stereo camera, and the second test structure is a second stereo camera. The first array and the first test structure may be disposed at a first distance from each other, allowing no contact between the first array and the first test structure. The first array and the second array may have minimal displacement when subjected to the test condition.

At block 406, the device may apply a test condition to the first array, the second array, the first test structure, and the second test structure. The test condition may be vibration or thermal shock.

At block 408, the device may collect a first output from applying the test condition to the first test structure.

At block 410, the device may collect a second output from applying the test condition to the second test structure. The first output and the second output may be linear measurements that are converted to rotational measurements presented in pitch, yaw, and roll.

At block 412, the device may generate a first deviation vector associated with the first output. The device may compare the first deviation vector to a reference vector associated with a reference structure. The device may compare the second deviation vector to the reference vector. The reference structure is subjected to the test condition separately from testing the first structure and the second structure.

At block 414, the device may generate a second deviation vector associated with the second output.

At block 416, the device may determine a first design status of the first structure based on the first deviation vector. The first design status or the second design status may be at least one of a failed alignment or a successful alignment between the first structure and the second structure. The first design status may indicate a failed alignment when a comparison between the first structure and a reference structure results in a difference that is below an alignment threshold. The first design status may indicate a successful alignment when a comparison between the first structure and a reference structure results in a difference that is below an alignment threshold.

At block 418, the device may determine a second design status of the second structure based on the second deviation vector.

It is understood that the above descriptions are for purposes of illustration and are not meant to be limiting.

Figure 5:
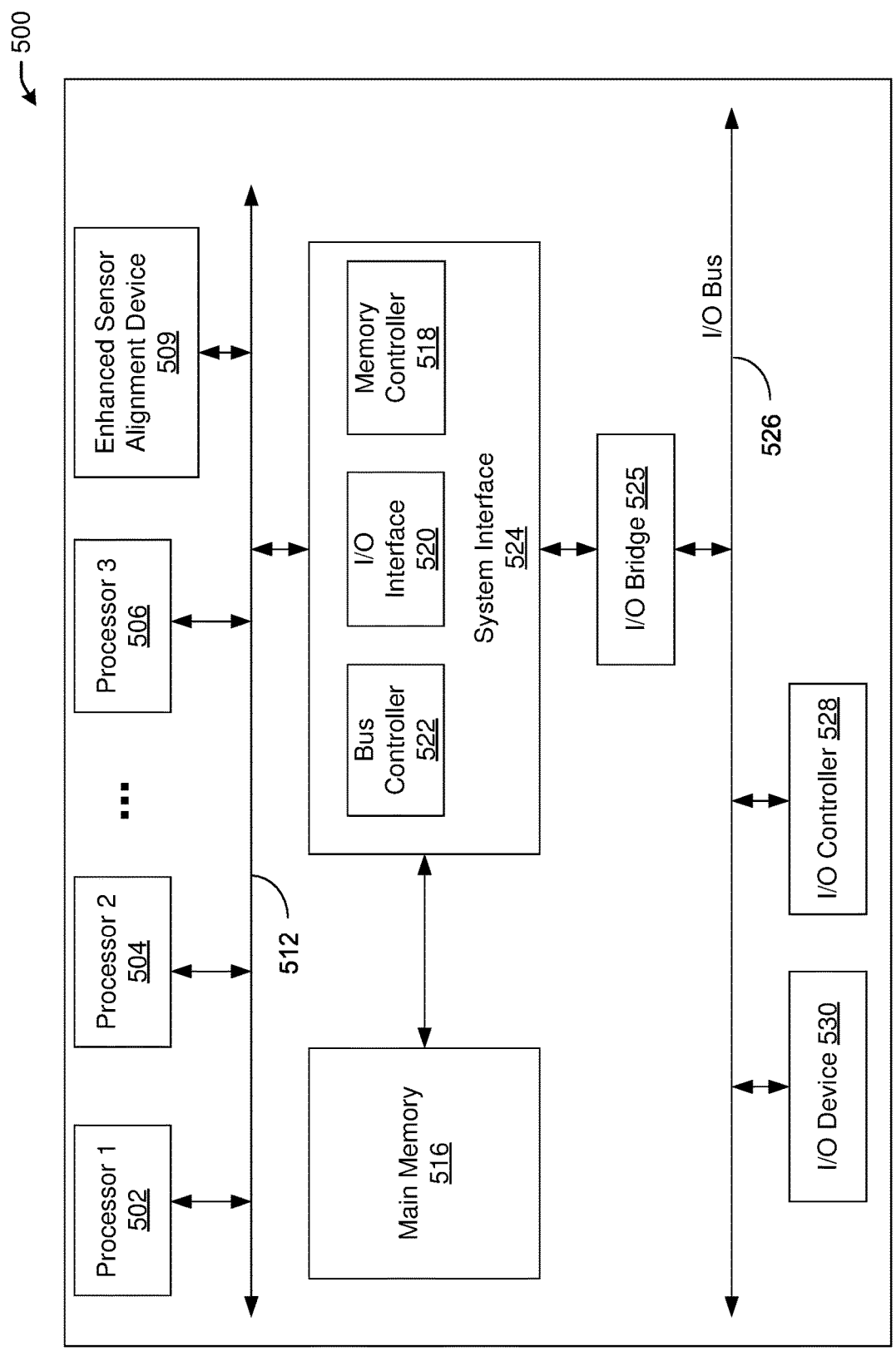
FIG. 5 is a block diagram illustrating an example of a computing device or computer system upon which any of one or more techniques (e.g., methods) may be performed, in accordance with one or more example embodiments of the present disclosure.

FIG. 5 is a block diagram illustrating an example of a computing device or computer system 500 upon which any of one or more techniques (e.g., methods) may be performed, in accordance with one or more example embodiments of the present disclosure.

For example, the computing system 500 of FIG. 5 may represent the one or more processors 132 and/or the one or more measurement devices of FIGS. 2A, 2B, and 3, and therefore may assess and validate the sensors in the sensor system 110 of FIG. 1. The computer system (system) includes one or more processors 502-506. Processors 502-506 may include one or more internal levels of cache (not shown) and a bus controller (e.g., bus controller 522) or bus interface (e.g., I/O interface 520) unit to direct interaction with the processor bus 512. An enhanced sensor alignment device 509 may also be in communication with the Processors 502-506 and may be connected to the processor bus 512.

Processor bus 512, also known as the host bus or the front side bus, may be used to couple the processors 502-506 and/or the enhanced sensor alignment device 509 with the system interface 524. System interface 524 may be connected to the processor bus 512 to interface other components of the system 500 with the processor bus 512. For example, system interface 524 may include a memory controller 518 for interfacing a main memory 516 with the processor bus 512. The main memory 516 typically includes one or more memory cards and a control circuit (not shown). System interface 524 may also include an input/output (I/O) interface 520 to interface one or more I/O bridges 525 or I/O devices 530 with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506 and/or the enhanced sensor alignment device 509. Another type of user input device includes cursor control, such as a mouse, a trackball, or cursor direction keys for communicating direction information and command selections to the processors 502-506 and/or the enhanced sensor alignment device 509 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506 and/or the my enhanced sensor alignment device 509. Main memory 516 also may be used for storing temporary variables or other intermediate information during execution of instructions by the processors 502-506 and/or the enhanced sensor alignment device 509. System 500 may include read-only memory (ROM) and/or other static storage device coupled to the processor bus 512 for storing static information and instructions for the processors 502-506 and/or the enhanced sensor alignment device 509. The system outlined in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 and/or the enhanced sensor alignment device 509 to perform the process steps described herein. In alternative embodiments, circuitry may be used in place of or in combination with the software instructions. Thus, embodiments of the present disclosure may include both hardware and software components.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In one or more embodiments, a device comprising processing circuitry coupled to storage, the processing circuitry may be configured to: determine a first array of high fidelity sensors proximate to a first test structure; determine a second array of high fidelity sensors proximate to a second test structure; apply a test condition to the first array, the second array, the first test structure, and the second test structure; collect a first output from applying the test condition to the first test structure; collect a second output from applying the test condition to the second test structure; generate a first deviation vector associated with the first output; generate a second deviation vector associated with the second output; determine a first design status of the first structure based on the first deviation vector, and determine a second design status of the second structure based on the second deviation vector. The first test structure may be a first stereo camera, and the second test structure may be a second stereo camera. The processing circuitry may be further configured to: compare the first deviation vector to a reference vector associated with a reference structure, and compare the second deviation vector to the reference vector. The reference structure may be subjected to the test condition separately from testing the first structure and the second structure. The first array and the first test structure are disposed at a first distance from each other allowing no contact between the first array and the first test structure. The first design status or the second design status may be at least one of a failed alignment or a successful alignment between the first structure and the second structure. The first design status indicates a failed alignment when a comparison between the first structure and a reference structure results in a difference that may be below an alignment threshold. The first design status indicates a successful alignment when a comparison between the first structure and a reference structure results in a difference that may be below an alignment threshold. The first output and the second output are linear measurements that are converted to rotational measurements. The test condition may be vibration or thermal shock. The first array and the second array have minimal displacement when subjected to the test condition.

In one or more embodiments, a non-transitory computer-readable medium storing computer-executable instructions which when executed by one or more processors result in performing operations comprising: determining a first array of high fidelity sensors proximate to a first test structure; determining a second array of high fidelity sensors proximate to a second test structure; applying a test condition to the first array, the second array, the first test structure, and the second test structure; collecting a first output from applying the test condition to the first test structure; collecting a second output from applying the test condition to the second test structure; generate a first deviation vector associated with the first output; generating a second deviation vector associated with the second output; determining a first design status of the first structure based on the first deviation vector; and determining a second design status of the second structure based on the second deviation vector. The operations may further comprise: comparing the first deviation vector to a reference vector associated with a reference structure; and comparing the second deviation vector to the reference vector. The reference structure may be subjected to the test condition separately from testing the first structure and the second structure. The first array and the first test structure are disposed at a first distance from each other allowing no contact between the first array and the first test structure. The first design status or the second design status may be at least one of a failed alignment or a successful alignment between the first structure and the second structure. The first design status indicates a failed alignment when a comparison between the first structure and a reference structure results in a difference that may be below an alignment threshold. The first design status indicates a successful alignment when a comparison between the first structure and a reference structure results in a difference that may be below an alignment threshold. The first output and the second output are linear measurements that are converted to rotational measurements. The test condition may be vibration or thermal shock. The first array and the second array have minimal displacement when subjected to the test condition.

In one or more embodiments, a method may comprise: determining a first array of high fidelity sensors proximate to a first test structure; determining a second array of high fidelity sensors proximate to a second test structure; applying a test condition to the first array, the second array, the first test structure, and the second test structure; collecting a first output from applying the test condition to the first test structure; collecting a second output from applying the test condition to the second test structure; generating a first deviation vector associated with the first output; generating a second deviation vector associated with the second output; determine a first design status of the first structure based on the first deviation vector; and determining a second design status of the second structure based on the second deviation vector. The method may further comprise comparing the first deviation vector to a reference vector associated with a reference structure, and comparing the second deviation vector to the reference vector. The reference structure may be subjected to the test condition separately from testing the first structure and the second structure. The first array and the first test structure are disposed at a first distance from each other allowing no contact between the first array and the first test structure. The first design status or the second design status may be at least one of a failed alignment or a successful alignment between the first structure and the second structure. The first design status indicates a failed alignment when a comparison between the first structure and a reference structure results in a difference that may be below an alignment threshold. The first design status indicates a successful alignment when a comparison between the first structure and a reference structure results in a difference that may be below an alignment threshold. The first output and the second output are rotational measurements. The test condition may be vibration or thermal shock. The first array and the second array have minimal displacement when subjected to the test condition.

In one or more embodiments, an apparatus may comprise means for determining a first array of high fidelity sensors proximate to a first test structure; determining a second array of high fidelity sensors proximate to a second test structure; applying a test condition to the first array, the second array, the first test structure, and the second test structure; collecting a first output from applying the test condition to the first test structure; collecting a second output from applying the test condition to the second test structure; generating a first deviation vector associated with the first output; generating a second deviation vector associated with the second output; determining a first design status of the first structure based on the first deviation vector, and determining a second design status of the second structure based on the second deviation vector. The apparatus may further comprise means for comparing the first deviation vector to a reference vector associated with a reference structure, and comparing the second deviation vector to the reference vector. The reference structure may be subjected to the test condition separately from testing the first structure and the second structure. The first array and the first test structure are disposed at a first distance from each other, allowing no contact between the first array and the first test structure. The first design status or the second design status may be at least one of a failed alignment or a successful alignment between the first structure and the second structure. The first design status indicates a failed alignment when a comparison between the first structure and a reference structure results in a difference that may be below an alignment threshold. The first design status indicates a successful alignment when a comparison between the first structure and a reference structure results in a difference that may be below an alignment threshold. The first output and the second output are rotational measurements. The test condition may be vibration or thermal shock. The first array and the second array have minimal displacement when subjected to the test condition.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A device comprising processing circuitry coupled to storage, wherein the processing circuitry is configured to:
   determine a first array of displacement sensors proximate to a first test structure;
   determine a second array of displacement sensors proximate to a second test structure;
   apply a test condition to the first array, the second array, the first test structure, and the second test structure;
   collect a first output from applying the test condition to the first test structure;
   collect a second output from applying the test condition to the second test structure;
   generate a first deviation vector by comparing the first output to a reference vector, wherein the reference vector is obtained by applying the test condition to a reference structure and representing a movement of the reference structure as the reference vector, and wherein the test condition is applied to the reference structure separately from testing the first test structure and the second test structure;
   generate a second deviation vector by comparing the second output to the reference vector;
   determine a first design status of the first structure based on the first deviation vector; and
   determine a second design status of the second structure based on the second deviation vector.

2. The device of claim 1, wherein the first test structure is a first stereo camera and the second test structure is a second stereo camera.

3. The device of claim 1, wherein the first array and the first test structure are disposed at a first distance from each other allowing no contact between the first array and the first test structure.

4. The device of claim 1, wherein the first design status or the second design status is at least one of a failed alignment or a successful alignment between the first structure and the second structure.

5. The device of claim 1, wherein the first design status indicates a failed alignment when a comparison between the first structure and the reference structure results in a difference that is below an alignment threshold.

6. The device of claim 1, wherein the first design status indicates a successful alignment when a comparison between the first structure and the reference structure results in a difference that is below an alignment threshold.

7. The device of claim 1, wherein the first output and the second output are rotational measurements.

8. The device of claim 1, wherein the test condition is vibration or thermal shock.

9. The device of claim 1, wherein the first array and the second array have minimal displacement when subjected to the test condition.

10. A method comprising:
    determining, by a processor, a first array of displacement sensors proximate to a first test structure;
    determining a second array of displacement sensors proximate to a second test structure;
    applying a test condition to the first array, the second array, the first test structure, and the second test structure;
    collecting a first output from applying the test condition to the first test structure;
    collecting a second output from applying the test condition to the second test structure;
    generating a first deviation vector by comparing the first output to a reference vector, wherein the reference vector is obtained by applying the test condition to a reference structure and representing a movement of the reference structure as the reference vector, and wherein the test condition is applied to the reference structure separately from testing the first test structure and the second test structure;
    generating a second deviation vector by comparing the second output to the reference vector;
    determining a first design status of the first structure based on the first deviation vector; and
    determining a second design status of the second structure based on the second deviation vector.

11. The method of claim 10, wherein the first array and the first test structure are disposed at a first distance from each other allowing no contact between the first array and the first test structure.

12. The method of claim 10, wherein the first design status or the second design status is at least one of a failed alignment or a successful alignment between the first structure and the second structure.

13. The method of claim 10, wherein the first design status indicates a failed alignment when a comparison between the first structure and the reference structure results in a difference that is below an alignment threshold.

14. The method of claim 10, wherein the first design status indicates a successful alignment when a comparison between the first structure and the reference structure results in a difference that is below an alignment threshold.

15. A system, comprising:
    at least one memory that stores computer-executable instructions; and
    at least one processor configured to access the at least one memory and execute the computer-executable instructions to:
    determine a first array of displacement sensors proximate to a first test structure;
    determine a second array of displacement sensors proximate to a second test structure;
    apply a test condition to the first array, the second array, the first test structure, and the second test structure;
    collect a first output from applying the test condition to the first test structure;

collect a second output from applying the test condition to the second test structure;

generate a first deviation vector by comparing the first output to a reference vector, wherein the reference vector is obtained by applying the test condition to a reference structure and representing a movement of the reference structure as the reference vector, and wherein the test condition is applied to the reference structure separately from testing the first test structure and the second test structure;

generate a second deviation vector by comparing the second output to the reference vector;

determine a first design status of the first structure based on the first deviation vector; and determine a second design status of the second structure based on the second deviation vector.

16. The device of claim 1, wherein the first output comprises measurements in the form of pitch, yaw, and roll corresponding to the first test structure, and the second output comprises measurements in the form of pitch, yaw, and roll corresponding to the second test structure.

17. The device of claim 1, wherein the first array of displacement sensors and the second array of displacement sensors are linear non-contact type sensors.

18. The method of claim 10, wherein the first output comprises measurements in the form of pitch, yaw, and roll corresponding to the first test structure, and the second output comprises measurements in the form of pitch, yaw, and roll corresponding to the second test structure.

19. The method of claim 10, wherein the first array of displacement sensors and the second array of displacement sensors are linear non-contact type sensors.

20. The system of claim 15, wherein the first output comprises measurements in the form of pitch, yaw, and roll corresponding to the first test structure, and the second output comprises measurements in the form of pitch, yaw, and roll corresponding to the second test structure.

* * * * *